United States Patent
Habetha et al.

(10) Patent No.: US 9,078,260 B2
(45) Date of Patent: Jul. 7, 2015

(54) INTERCONNECTION OF WIRELESS NETWORKS USING A MASTER/SLAVE NODE

(75) Inventors: Jörg Habetha, Aachen (DE); Adolfo Jose Roque, Ingolstadt (DE); Francesc Dalmases, Bellaterra-Barcelona (ES)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1870 days.

(21) Appl. No.: 11/576,169

(22) PCT Filed: Sep. 21, 2005

(86) PCT No.: PCT/IB2005/053104
§ 371 (c)(1),
(2), (4) Date: Mar. 28, 2007

(87) PCT Pub. No.: WO2006/035367
PCT Pub. Date: Apr. 6, 2006

(65) Prior Publication Data
US 2009/0248829 A1 Oct. 1, 2009

(30) Foreign Application Priority Data
Sep. 29, 2004 (EP) .................................... 04104768

(51) Int. Cl.
*H04W 72/04* (2009.01)
*H04W 92/02* (2009.01)
(Continued)

(52) U.S. Cl.
CPC .......... *H04W 72/0453* (2013.01); *H04W 92/02* (2013.01); *H04W 76/046* (2013.01); *H04W 84/22* (2013.01); *H04W 40/00* (2013.01)

(58) Field of Classification Search
USPC ................................................. 709/230–237
See application file for complete search history.

(56) References Cited

U.S. PATENT DOCUMENTS 6,816,502 B2* 11/2004 Ekl et al. ........................ 370/447
2002/0075941 A1* 6/2002 Souissi et al. ................. 375/133
(Continued)

FOREIGN PATENT DOCUMENTS

| EP | 1331763 A2 | 7/2003 |
|---|---|---|
| WO | 0237770 A2 | 5/2002 |
| WO | WO 02091682 A1 * | 11/2002 |

OTHER PUBLICATIONS

Baatz S et al: "Bluetooth Scatternets: An Enhanced Adaptive Shceduling Scheme", 21st. Annual Joint Conference of the IEEE Computer and Communications Societies, Proceedings IEEE INFOCOM, vol. 1 of 3, pp. 782-790, 2002, XP010593640.
Kalia et al: "Scatternet Structure and Inter-Piconet Communication in the Bluetooth System", IEEE NCC, 2000, pp. 1-4, XP000863816.
J.Habetha, J.Wiegert; "A Comparison of New Single and Multiple Transceiver", In Symposium on Performance Evaluation of Computer and Telecommunication Systems (SPECTS), pp. 436, 2001.
(Continued)

*Primary Examiner* — Jackie Zuniga Abad
(74) *Attorney, Agent, or Firm* — Larry Liberchuk

(57) ABSTRACT

A network array (200) comprises a first network (201) having a plurality of first nodes (203, 204, 209), comprises a second network (202) having a plurality of second nodes (206, 209) and comprises a forwarder node (209). The forwarder node (209) constitutes one of the first nodes (203, 204, 209) and constitutes one of the second nodes (206, 209) to form a communication interface between the first network (201) and the second network (202) in such a manner that the forwarder node (209) functions as a slave in the first network (201) and as a master in the second network (202). The forwarder node (209) is adapted to communicate with the first network (201) using a first operation frequency and is adapted to communicate with the second network (202) using a second operation frequency which is different from the first operation frequency.

18 Claims, 7 Drawing Sheets

(51) Int. Cl.
*H04W 40/00* (2009.01)
*H04W 76/04* (2009.01)
*H04W 84/22* (2009.01)

(56) References Cited

U.S. PATENT DOCUMENTS

2003/0058832 A1    3/2003    Knauerhase et al.
2004/0063451 A1*   4/2004    Bonta et al. ............ 455/519

OTHER PUBLICATIONS

N, Essling, et al; "A Multi Hop Concept for HiperLAN/2", European Wireless, 2002.
J. Peetz; "HiperLAN/2 Multihop Adhoc Communication", In Proc. of Vehicular Technology Conference (VTC), 2001.
"IEEE 802.11 WG, part 11: Wireless LAN Medium Access Control", 2003.

* cited by examiner

INTERCONNECTION OF WIRELESS NETWORKS USING A MASTER/SLAVE NODE

The invention relates to the field of networks. In particular, the invention relates to a network array, to a forwarder device and to a method of operating a forwarder device.

Wireless networks can be divided into infrastructure-based networks and self-organizing (ad-hoc) networks. Traditionally, radio networks are usually infrastructure-based. However, interest in self-organizing networks has recently grown owing to the possible ad-hoc deployment of the systems.

In infrastructure networks, communication is provided between wireless clients and wired network resources using a communication hub known as a base station (BS) or access point (AP). A hub is used in telecommunications in order to connect network segments or single computers. Signals originating from a network node are transmitted from a hub to another network node.

In contrast to infrastructure networks, ad-hoc networks do not use a communication hub (AP). Instead, the devices communicate directly with each other in an ad-hoc network. Ad-hoc networks can be created spontaneously, and in an arbitrary manner, and used to support mutual communication among wireless clients.

As there are no central entities in an ad-hoc network, each node in the network functions as a router, forwarding packages to other nodes in the network. This is called multi-hop routing.

Whereas ad-hoc networks were used mainly by the military in the past, today various other applications are foreseen. Examples are Personal Area Networks (PAN) for short range communications and In-house Digital Networks (IHDN) for audio, video and data exchange. First communication standards with ad-hoc capability have already been completed: Bluetooth a wireless PAN, IEEE 802.11, a wireless Local Area Network (WLAN) and Hiper-LAN/2, a WLAN and IHDN.

In the following, a scenario is considered composed by stations compliant with the standard IEEE 802.11e, (QSTAs, Quality of Service stations) and an Access Point also 802.11e compliant and having Hybrid Coordinator (HC) capabilities (AP/HC).

Such a network scenario is illustrated in FIG. 1.

FIG. 1 shows a network array 100 comprising a QBSS network 101 and an IBSS network 102. The term "QBSS" denotes a Quality of Service Basis Service Set, whereas the term IBSS denotes an Independent Basis Service Set.

The QBSS network 101 comprises a hub 103 (i.e. an access point AP having Hybrid Coordinator (HC) capabilities, "AP/HC"). The hub 103 forms a master in the QBSS network 101 and controls a plurality of QSTA terminals 104 as slaves in the QBSS network 101. The hub 103 is adapted to communicate with each of the QSTA terminals 104 via a communication path 105.

In the IBSS network 102, a plurality of QSTA terminals 106 are formed which may communicate with each other via communication paths 107.

As shown in FIG. 1, the QSTAs 104 within the range of hub 103 (AP/HC), associate to the AP/HC 103 forming the QoS Basic Service Set QBSS 101 controlled the AP/HC 103. On the other side, the stations 106 out of the AP/HC 103 range will establish the Independent Basis Service Set (IBSS) 102 working in an ad-hoc mode.

However, it is not possible to transmit data packets from one of the QSTA terminals 104 to one of the QSTA terminals 106, and vice versa.

It is known from the state of the art (Habetha, J., Wiegert, J. "A Comparison of New Single- and Multiple-Transceiver Data Forwarding Mechanisms for Multihop Ad Hoc Wireless Networks", In Symposium on Performance Evaluation of Computer and Telecommunication Systems (SPECTS), page 436, Orlando, July 2001) to connect different clusters of a cluster-based multihop ad hoc network by a forwarder. According to this architecture, terminals as slaves of two different clusters can communicate via central controllers as masters within each of the clusters and via the forwarder. However, the functionality of the forwarder in the described network system is limited to a communication with central controllers.

It is an object of the invention to provide a forwarder for a network array with an improved functionality.

In order to achieve the object defined above, a network array, a forwarder device and a method of operating a forwarder device with the features according to the independent claims are provided.

The network array of the invention comprises a first network having a plurality of first nodes, comprises a second network having a plurality of second nodes and comprising a forwarder node. The forwarder node constitutes one of the first nodes and constitutes one of the second nodes to form a communication interface between the first network and the second network in such a manner that the forwarder node functions as a slave in the first network and as a master in the second network. The forwarder node is adapted to communicate with the first network using a first operation frequency and is adapted to communicate with the second network using a second operation frequency which is different from the first operation frequency.

Further, a forwarder device for forming a communication interface between a first network and a second network of a network array is provided, being adapted to constitute one of a plurality of first nodes of a first network and being adapted to constitute one of a plurality of second nodes of a second network to form a communication interface between the first network and the second network in such a manner that the forwarder device functions as a slave in the first network and as a master in the second network, and being adapted to communicate with the first network using a first operation frequency and being adapted to communicate with the second network using a second operation frequency which is different from the first operation frequency.

Beyond this, a method of operating a forwarder device for forming a communication interface between a first network and a second network of a network array is provided, comprising the steps of adapting the forwarder device to constitute one of a plurality of first nodes of a first network and adapting the forwarder device to constitute one of a plurality of second nodes of a second network to form a communication interface between the first network and the second network in such a manner that the forwarder device functions as a slave in the first network and as a master in the second network. Further, the forwarder device is adapted to communicate with the first network using a first operation frequency, and the forwarder device is adapted to communicate with the second network using a second operation frequency which is different from the first operation frequency.

The characteristic features according to the invention have particularly the advantage that a sophisticated network array architecture is provided which is based on a forwarder node as an interface node for enabling communication between the nodes of two networks, wherein the forwarder node fulfils the double function of a slave in the first network and of a master in the second network. This dual nature of the forwarder node is combined advantageously with the frequency switching functionality of the forwarder node, i.e. the separation of the operation frequencies with which the forwarder node communicates with the first network on the one hand, and with which the forwarder node communicates with the second network on the other hand. This data packages forwarding scheme in the frequency domain uses two different operation frequencies and increases the total capacity in each of the network systems.

By adapting the forwarder node to function selectively as a slave or as a master in a network, it is possible to realize the first network as a first QBSS network having a communication hub (AP/HC) as a master and to implement the second network as a second QBSS network without such a hub. In this scenario, the forwarder node acts as a slave in the first QBSS network in which the communication hub forms a master, and may act a master in the second QBSS network controlling the second nodes of the second network.

Thus, the forwarder node of the invention switches between two communication modes, namely a first communication mode in which it is adapted to communicate via the communication hub with the terminals of the first network, and a second communication mode in which the forwarder node is adapted to communicate with the nodes of the second QBSS network to exchange data with these second nodes. The switching between the two communication modes can be synchronized with a switching between the two operation frequencies, i.e. the forwarder node can be switched between a first mode in which it communicates with the first network and in which it works on the first operation frequency, and a second mode in which it communicates with the second network and in which it works on the second operation frequency.

Particularly, the invention can be implemented in the frame of a WLAN, particularly based on the IEEE 802.11 standard which is described in IEEE 802.11 WG, part 11: Wireless LAN Medium Access Control (MAC) and Physical Layer (PHY) specifications, Standard IEEE, November 1997. Further, the invention can be implemented with enhancement for Quality of Service (QoS), known as IEEE 802.11e, as described in IEEE 802.11 WG, part 11: Wireless LAN Medium Access Control (MAC) and Physical Layer (PHY) specifications: Medium-Access Control (MAC) Enhancements for Quality of Service (QoS), 802.11e/D5.0, Draft Supplement to IEEE 802.11 Standard, July 2003.

As a solution for connecting two networks according to the invention, a dedicated device responsible for connecting both networks is used. This device, namely the forwarder (FHC), relays (i.e. forwards) packets from an AP/HC to a remote QSTA and vice versa. This relay process can be performed in a transparent way, that is, neither the AP/HC nor the QSTA requires routing capabilities.

Many of the existing multi-hop ad-hoc networks forward packets in the time domain, using only one frequency channel. However, forwarding in the frequency domain, as performed by the invention, is preferable and increases the total capacity in each QBSS. The invention preferably performs frequency forwarding using a single transceiver.

In other words, the invention provides a frequency forwarding mechanism with Quality of Service support. Particularly, the invention teaches the use of a device, namely the forwarder, which may be composed of a single transceiver, dedicated to forward packets between two networks operating on two different frequency channels. The forwarder may behave as a QSTA in the first QBSS in which the AP/HC is located and may act as a Hybrid Coordinator (HC) in the remote second QBSS. When forwarding in the frequency domain with a single transceiver, the forwarder does usually not receive/transmit packets simultaneously in both QBSSs. Thus, it first communicates with one QBSS, then switches a channel, and later communicates with the other QBSS, and so on.

Referring to the dependent claims, further preferred embodiments of the invention will be described in the following.

Next, preferred embodiments of the network array of the invention will be described. These embodiments may also be applied for the forwarder device and the method of operating a forwarder device.

The first network may be adapted as a master-slave network, and the second network may be adapted as a master-slave network.

A "master" in the meaning of this specification is a node which provides commands to another node, namely the slave, and thus conducts the functionality of the slave. On the other hand, a "slave" is a node which receives commands and which is conducted by another node, namely the master. In contrast to a peer-to-peer communication, the nodes in a master-slave architecture are not equal. In contrast to this, a hierarchy exists between master and slave: the master drives the slave, the slave is driven by the master.

The first network may be adapted as an infrastructure network, and the second network may be adapted as an ad-hoc network. In an infrastructure network, a communication between nodes may be controlled by a communication hub known as a base station (BS) or access point (AP). On the other hand, ad-hoc networks do not use such an AP. Instead of this, the devices communicate directly with each other in an ad-hoc network. Such an ad-hoc network may be a self-configuring network of mobile routers connected by links, preferably by wireless links. According to the invention, when the forwarder node participates in the communication between the nodes of the ad-hoc network, the forwarder node may fulfil the functionality of a master for driving the remaining nodes of the ad-hoc network.

The plurality of first nodes may comprise a communication hub which functions as a master in the first network. Such a communication hub or Access Point acts as the master for driving the remaining first nodes in the first network and for driving the forwarder node in an operation mode, in which the forwarder node takes part in a communication within the first network.

The forwarder node may be adapted to function as a Hybrid Coordinator in the second network. Particularly, the forwarder node may behave as a Hybrid Coordinator in the second network implemented as a QBSS network, and then the forwarder node has preferably implemented all the functions of a Hybrid Coordinator (HC) like beacon generation, traffic negotiation of traffic requests, polling of stations and scheduling the local traffic in the QBSS network.

Further, the forwarder node may be adapted to switch between a first operation state in which the forwarder node is communicatively coupled with the first network and is free of a communication with the second network, and a second operation state in which the forwarder node is communicatively coupled with the second network and is free of a communication with the first network. According to this embodiment, the forwarder node communicates either with first network or with the second network. To switch between these two operation states or modes, the operation frequency may be changed and thus adapted to a communication with the nodes in the first network or with the nodes in the second network.

The forwarder node may be adapted to block any data packet originating from the second network when the forwarder node is operated in the first operation state. According to this embodiment, it is securely avoided that a data package coming from a node of the second network is lost, since the forwarder node is presently in communication with a node of the first network. By blocking any signals coming from nodes from the second network when the forwarder is in the first operation state, data loss is prevented and the reliability of the communication scheme is significantly improved.

Alternatively or additionally, the forwarder node may be adapted to, prior to switching from the first operation state to the second operation state, send a control signal to a master node of the first network indicating that the forwarder node functioning as a slave in the first network will switch over or pass into a sleeping mode. In other words, prior to switching to an operation state in which the forwarder node can exchange data with the second node of the second network, the forwarder node may send a control signal to the master (communication hub) of the first network in which it announces that it will go to a sleeping or doze mode in which it is deactivated from receiving or processing signals from the nodes of the first network.

Preferably, the forwarder node may be realized as a single transceiver.

The forwarder node may be adapted to communicate with the first network and with the second network according to the IEEE 802.11e standard. According to this embodiment, an enhancement of the Quality of Service can be realized.

Preferably, at least a part of the plurality of first nodes and/or of the plurality of second nodes of the network array of the invention is realized as a computer device. Some or all of the nodes can be realized as a personal computer, as a laptop computer, or the like. However, it is also possible to realize any of the nodes of the network system as a cellular phone or the like.

The forwarder node may be adapted to forward a data package from the first network to the second network or to forward a data package from the second network to the first network. Each kind of data packages can be transmitted between the nodes of the first network and the nodes of the second network. In this scenario, the forwarder node acts as an interface for transmitting the packets in either direction.

The forwarder node may be adapted, prior to forwarding a data package from the first network to the second network or to forwarding a data packet from the second network to the first network, to negotiate the data packet and to assign a certain bandwidth for forwarding the data packet. According to this embodiment, each traffic stream may be previously negotiated with the HC, and when accepted, a certain bandwidth may be assigned in terms of periodic Transmission Opportunities (TXOP). Therefore, the forwarder node can easily predict the time intervals when its presence in one of the networks, for instance in the first network, is required. Then it can maximize its presence in the other network, for instance in the second network, to generate beacons and schedule the forward and local traffic.

At least one of the first network and the second networks may be a wireless network. However, also wired networks fall under the scope of the invention.

Next, a preferred embodiment of the method of operating a forwarder device of the invention will be described. This embodiment may also be applied for the network array or for the forwarder device.

The method of operating a forwarder device preferably comprises the steps of sending, using the second operation frequency, a Beacon signal with a contention-free period (CFP) set according to an absence time of the forwarder device in the second network. Then, it may be switched from the second operation frequency to the first operation frequency. Afterwards, it may be negotiated, during a contention period (CF) of the first network, traffic streams to be forwarded. Then, an automatic power-safe delivery (APSD) bit can be activated during the traffic-stream negotiation process. Forwarded data may be received or transmitted in the first network. The method may comprise the step of switching from the first operation frequency to the second operation frequency. Forwarded data may be received or transmitted in the second network. Local traffic can be received or transmitted in the second network.

The aspects defined above and further aspects of the invention are apparent from the examples of embodiment to be described hereinafter and are explained with reference to the examples of embodiment.

The invention will be described in more detail hereinafter with reference to examples of embodiment but to which the invention is not limited.

FIG. 1 shows a schematic view of a network array having two networks each having a plurality of nodes, FIG. 2 shows a schematic view of a network array according to an embodiment of the invention, FIG. 3 shows a time diagram illustrating the frequency switching between two networks of a network array of the invention, FIG. 4 shows another timing diagram illustrating an embodiment of the forwarding scheme of the invention, FIG. 5 to FIG. 8 illustrate an SDL implementation of the synchronizing algorithm of the invention.

The illustration in the drawing is schematically.

In the following, referring to FIG. 2, a network array 200 according to an embodiment of the invention will be described in detail.

FIG. 2 shows a network array 200 comprising a first QBSS network 201 having a plurality of first QSTA terminals 204. Further, the network array 200 comprises a second QBSS network 202 having a plurality of second QSTA terminals 206. Beyond this, a forwarding device 209 is implemented as an interface between the two QBSS networks 201, 202 being realized as a single transceiver. The forwarder device 209 constitutes one of the nodes of the first QBSS network 201 and constitutes one of the nodes of the second QBSS network 202 to form a communication interface between the first QBSS network 201 and the second QBSS network 202 in such a manner that the forwarder device 209 functions as a slave in the first network 201 and functions as a master in the second QBSS network 202. The forwarder device 109 is further adapted to communicate with the first QBSS network 201 using a first operation frequency f1 and to communicate with the second QBSS network 202 using a second operation frequency f2 which is different from the first operation frequency f1.

As indicated by a switch 210, the forwarding device 209 can be switched between a first operation mode in which it works on the first operation frequency f1 to communicate with the nodes 203, 204 of the first QBSS network 201 and a second operation mode in which the forwarding device 209 communicates with the nodes 206 of the second QBSS network 202 using the second operation frequency f2. "f1" and "f2" each denote either a particular frequency value or alternatively a particular frequency band.

As can be further seen from FIG. 2, there is provided a first communication path 205 for a wireless communication between the hub 203 and any of the first QSTA terminals 204. Further, a second communication path 207 is provided for a communication between the forwarding device 209 on the one hand and any of the second QSTA terminals 206 of the second QBSS network 202 on the other hand. Thus, the forwarding device 209 acts as a master for controlling the second QSTA terminals 206 in the second operation mode, in which a communication between the forwarding device 209 and the nodes 206 of the second QBSS network 202 is enabled.

Further, a third communication path 208 may be established for a communication between the forwarding device 209 on the one hand and the hub 203 on the other hand. In this first operation mode, according to which data signals may be transmitted between the forwarding device 209 and the hub 203 on the first operation frequency f1, the forwarding device 209 acts as a slave in the first QBSS network 201 and is controlled by the hub 203 which may transmit signals forwarded from the forwarding device 209 to any of the first QSTA terminals 204, or vice versa.

Thus, FIG. 2 shows the connection of two QBSS networks 201, 202 by the use of a forwarder (FHC) 209.

When forwarding in frequency with a single transceiver, the FHC 209 cannot receive/transmit packets simultaneously in both QBSS networks 201, 202. In contrast to this, it needs first to communicate with one QBSS network (e.g. with the first QBSS network 201), to switch the channel (i.e. to change the operation frequency from f1 to f2) and to communicate the with the other QBSS network (e.g. with the second QBSS network 202), and so on.

In the following, referring to FIG. 3, a time schedule 300 for the switched communication between the forwarding device 209 and one of the two networks 201, 202 will be explained.

FIG. 3 shows the frequency switching between the two QBSS networks 201, 202, i.e. the switching between a first operation state 303 in which a communication on the first operation frequency f1 with the first network 201 is activated and a communication on the second operation frequency f2 with the second network 202 is deactivated, and a second operation state 304 in which a communication on the first operation frequency f1 with the first network 201 is deactivated and a communication on the second operation frequency f2 with the second network 202 is activated.

The time schedule 300 illustrates the time dependence of a first QBSS network communication scheme 301 and of a second QBSS network communication scheme 302. The first QBSS network communication scheme 301 illustrates the time dependence of active intervals 303 and inactive intervals 304 of a communication between the forwarding device 209 and the hub 203. The second QBSS network communication scheme 302 shows the time dependence of active intervals 304 and inactive intervals 303 concerning the communication between the forwarding device 209 and any of the QSTA terminals 206.

Therefore, as shown in FIG. 3, the forwarding device 209 is partly present in the first QBSS network 201 (and in these intervals absent in the second QBSS network 202). Consequently, packets sent to the forwarding device 209 during the absence might be lost.

Such a problem, which may be denoted as the "absence problem", has been studied for the IEEE 802.11 based network by Peetz, J., Efe, Y., Habetha, J. and Wischhusen, O. "Methode zum frequenzübergreifenden Forwarding basierend auf Power Management", PVE03-3501. This problem may be solved using the power save function defined in the standard IEEE 802.11 WG, part 11: Wireless LAN Medium Access Control (MAC) and Physical Layer (PYH) specifications, Standard IEEE, November 1997.

Before switching to another QBSS network, the forwarding device 209 emulates that it is entering in Doze mode, so the hub 203 will buffer all packets directed to the FHC 209 during its absence.

However, this solution requires routing information to be available in all the stations. Since it has been designed for the CSMA/CA protocol, it does not support QoS (Quality of Service).

The invention teaches the use of a device, namely the forwarding device 209, composed of a single transceiver and dedicated to forward packets between the two QBSS networks 201, 202 operating at different frequency channels f1 and f2.

The forwarding device (FHC) 109 behaves as a QSTA terminal in the first QBSS network 201 in which the AP/HC 203 is located. When present in the remote second QBSS network 202, the FHC 209 takes the role of a Hybrid Coordinator (HC), i.e. a central coordinator for other stations. In other words, the forwarding device 109 acts as a master in the second QBSS network 202. This way, all the QSTA terminals 206 of the second QBSS network 102 will associate to the FHC 209, which at the same time, will relay the association messages to the AP/HC 203. With this solution, it is ensured that the stations 206 in the second QBSS network 202 are "visible" to the AP/HC 203 without the need of a routing protocol.

Optionally, if the FHC 209 does not detect another HC during its operation, it can behave as a standard HC.

The communication between the AP/HC 203 and the FHC 209 and between the FHC 209 and the remote QSTA terminals 206 is established according to the IEEE 802.11e standard (use of the HC Channel Access (HCCA) mechanism and of the Enhanced Distributed Channel Access (EDCA) mechanism).

Since the FHC 209 behaves as a Hybrid Coordinator in the second QBSS network 202, it has implemented all the functions of a HC: beacon generation, traffic negotiation of traffic requests, polling of stations and scheduling the local traffic in the second QBSS network 202.

In addition to that, the forwarding device 209 has, according to the described embodiment, implemented a synchronization algorithm, which is illustrated in FIG. 4 and which will be described in the following.

The synchronization algorithm shown in FIG. 4 is illustrated by means of a time schedule 400 which shows the time dependence of a first QBSS network communication scheme 401 reflecting a communication between the forwarding device 209 and the hub 203 at a frequency f1, and of a second QBSS network communication scheme 402 reflecting the communication between the forwarding device 209 and one of the QBSS terminals 206 using the second operational frequency f2.

The solution shown in FIG. 4 takes advantage of the bandwidth reservation capabilities of the HCCA protocol. Each traffic stream is previously negotiated with the HC and when accepted, a certain bandwidth is assigned in terms of periodic Transmission Opportunities (TXOP) 403.

According to the forwarding concept shown in FIG. 4, the FHC 209 can easily predict the time intervals in which its presence in the first QBSS network 201 is required. Then, the forwarding device 109 can maximize its presence in the second QBSS network 202 to generate beacons 404 and schedule the forward and local traffic. The detailed calculations of the synchronization algorithm are described later.

At the same time, the forwarding device 209 ensures that no transmission takes place in the second QBSS network 202 while being present in the first QBSS network 201. This is solved by sending a beacon 404 with the contention-free period 405 (CFP) duration set according to the time expected to be in the first QBSS network 201. Optionally, for a better use of the capacity available in the second QBSS network 202, the forwarding device 209 can assign Direct links between stations of the second QBSS network 202, just before switching to the first QBSS network 201.

To avoid the absence problem in the first QBSS system 201, the forwarding device 209 will activate the APSD (Automatic Power-safe delivery function) during the TS-setup process. This way, the AP/HC 203 knows that the forwarding device 209 will be present only for the negotiated TXOP 403.

In order to minimize the number of frequency switches per superframe, the forwarding device 209 will use the Traffic Aggregation feature supported by the 802.11e extension. By setting the aggregation bit in the AddTS frame, the forwarding device 209 ensures that all the multihop traffic will be bundled in consecutive TXOPs 403.

As seen in FIG. 4, the periodicity of the TXOPs 403 is given by the Service Interval (SI) 406. For simplification, the synchronization algorithm according to the preferred embodiment of the invention uses in both QBSS networks 201, 202 the same value for the Service Interval 406 and the duration of each TXOP 403. Then, the forwarding device 209 needs to switch each Service Interval 406. Since the traffic in the QBSS needs to be blocked just before switching, and this is done by sending a beacon 404, the beacon interval in the second QBSS network 202, namely TBTT2, should be equal to the Service Interval 406 (SI).

In FIG. 4, it is considered that the contention period (CP) 407 in the first QBSS network 201 starts just after each beacon 404 and the first scheduled TXOP 403 is for multihop traffic (TXOP-FWD1). This is an optimum situation that reduces the amount of frequency-switches. Since the traffic streams are negotiated during the contention period 407, the forwarding device 209 may switch also at the beginning of a first QBSS network 201-superframe and will wait for its TXOP 403. In this case, the duration of the presence in the first QBSS network 201 will be the time to receive a beacon 404 plus a minimum contention period.

However, the AP/HC 203 could allocate the contention period 407 in another point of the superframe and multihop traffic can be allocated later. Due to the periodic nature of the CFP 405 and thus of the CP 407, it is quite probable that if there is no CP 407 at the beginning of the superframe, there will be one at the end. Then the forwarding device 209 will switch to the first QBSS network 201 before the beacon 404 is generated and will announce its presence sending a PS-Poll message. If the next switching time for the multihop traffic after the contention period CP 407 is close to it, the forwarding device 209 will remain in the first QBSS network 201. Otherwise it will switch to the second QBSS network 202.

In both cases, the beginning of the superframe in the second QBSS network 202 has to be shifted in order to allow the forwarding device 209 to generate a beacon 404 before switching to the first QBSS network 201.

FIG. 5 shows a first part of this synchronization algorithm, FIG. 6 shows a second part of this synchronization algorithm, FIG. 7 shows a third part of this synchronization algorithm, FIG. 8 shows a forth part of this synchronization algorithm.

Figure 1:
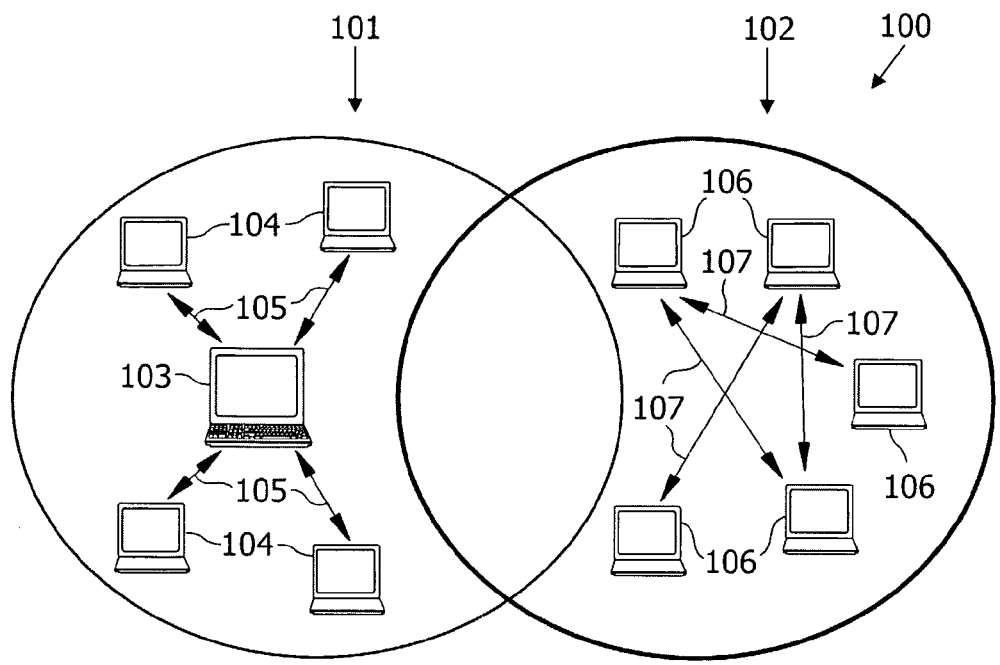
Figure 2:
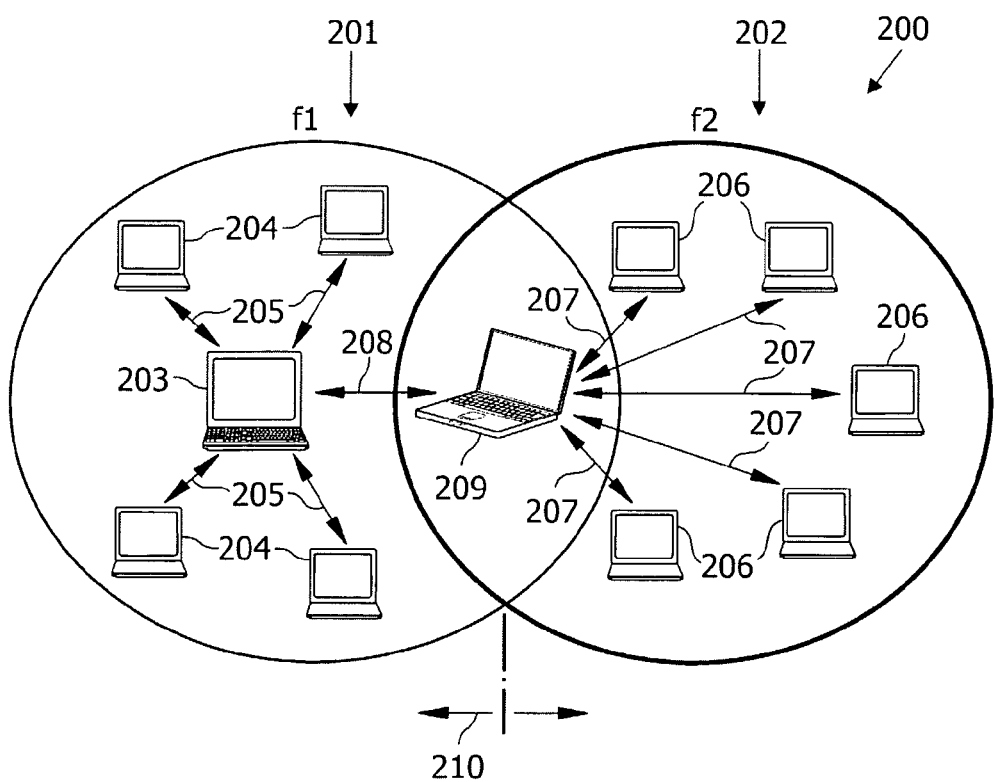
Figure 3:
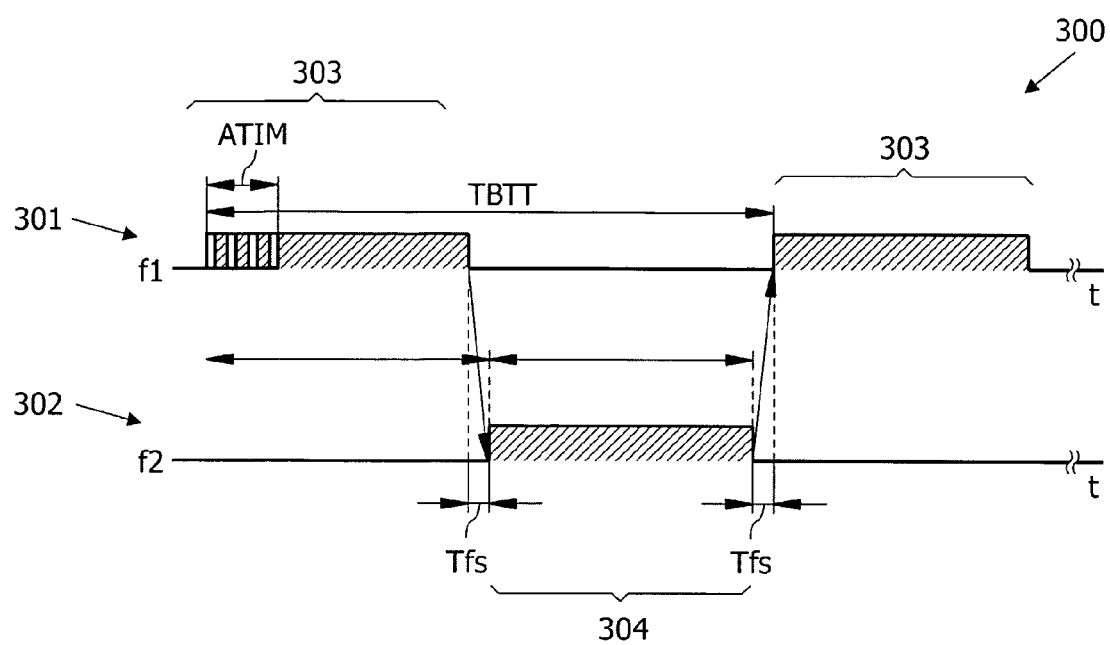
Figure 4:
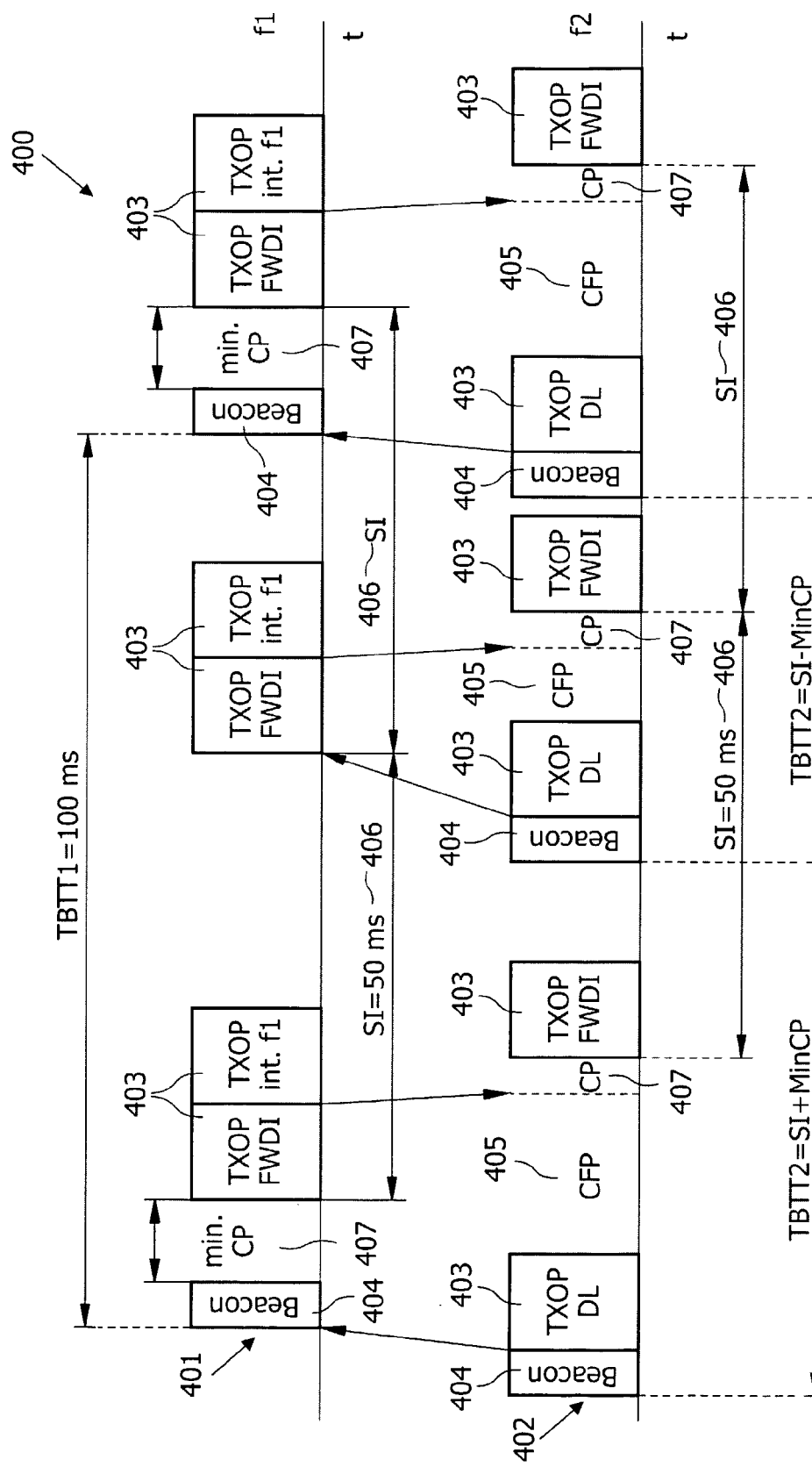
Figure 5:
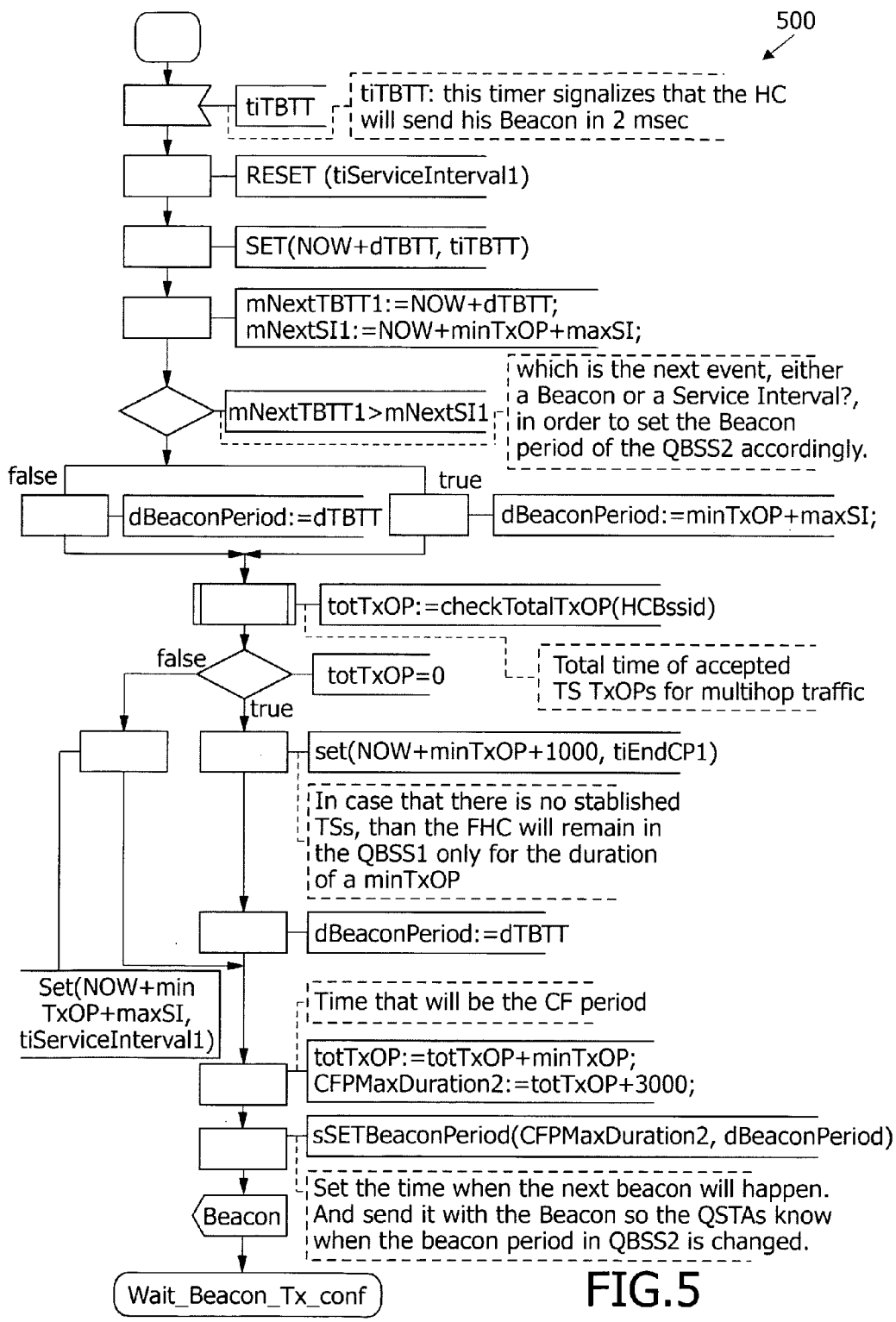
FIG. 5 to FIG. 8 show block diagrams illustrating an SDL implementation ("Specification and Design Language") of the synchronization algorithm for the scenario of FIG. 4.
Figure 6:
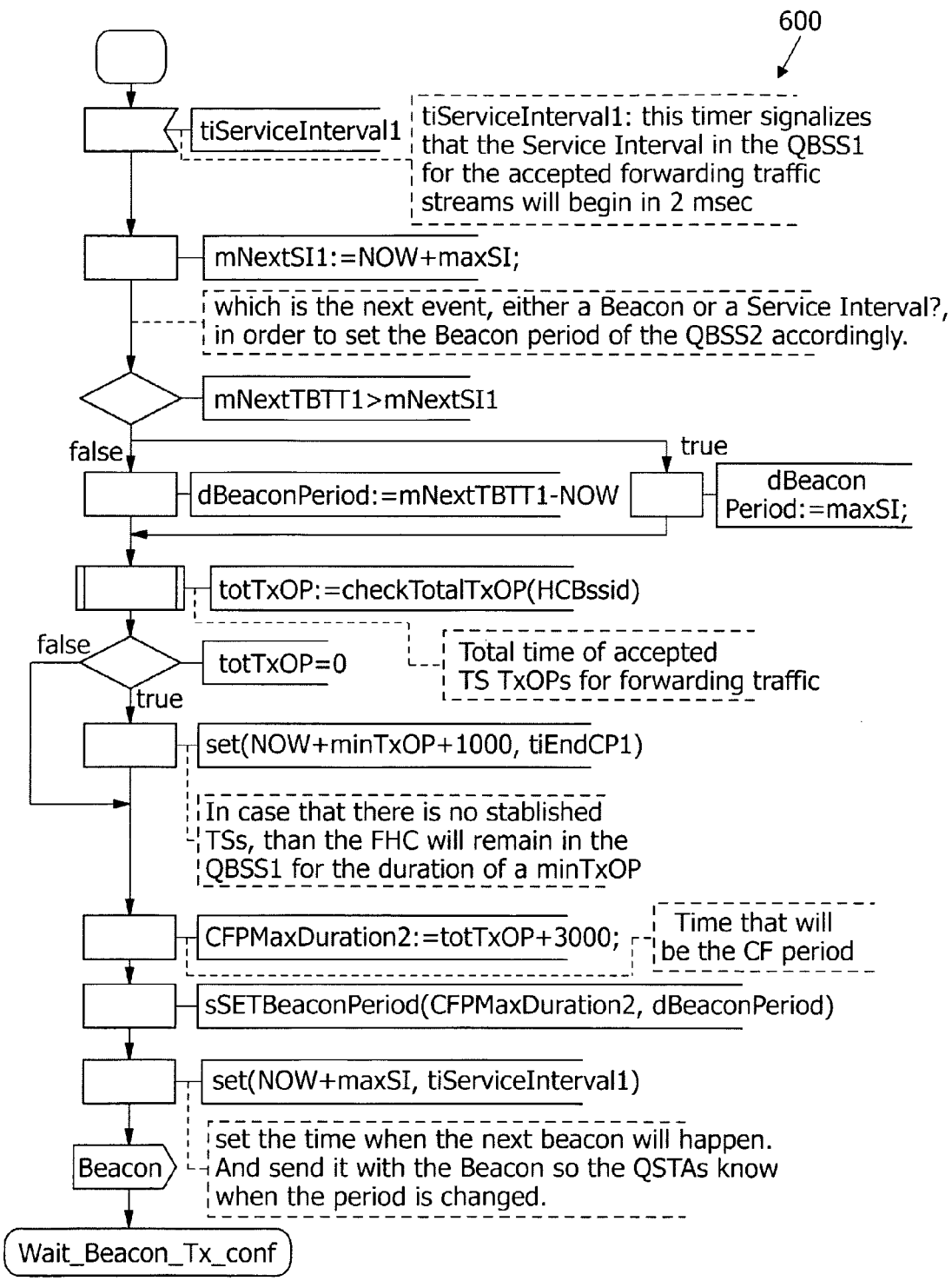
Figure 7:
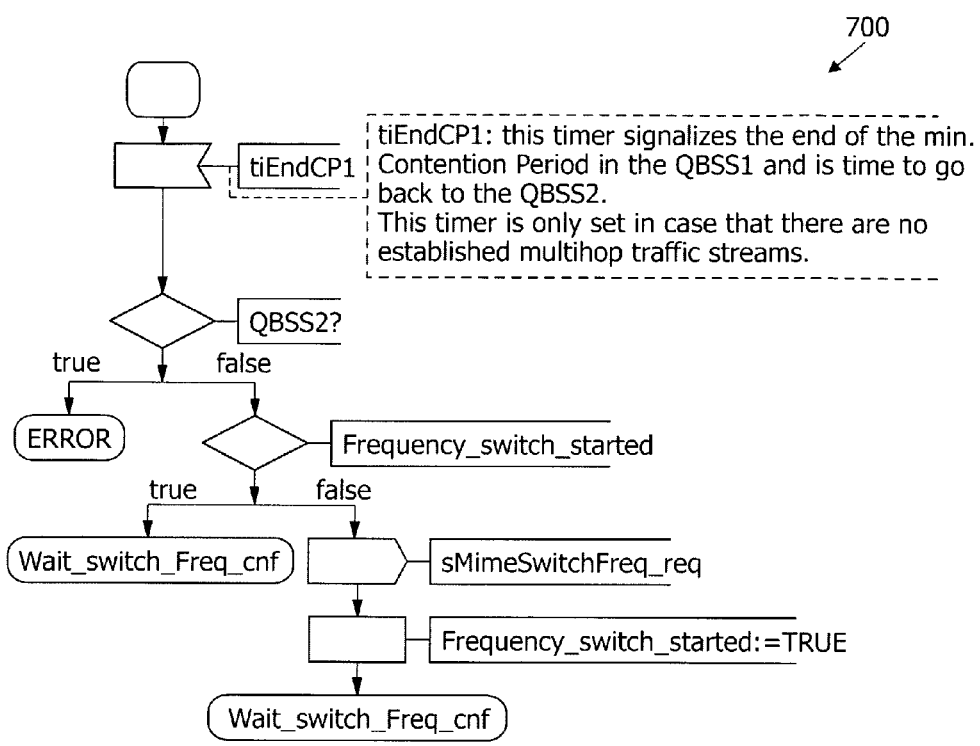
Figure 8:
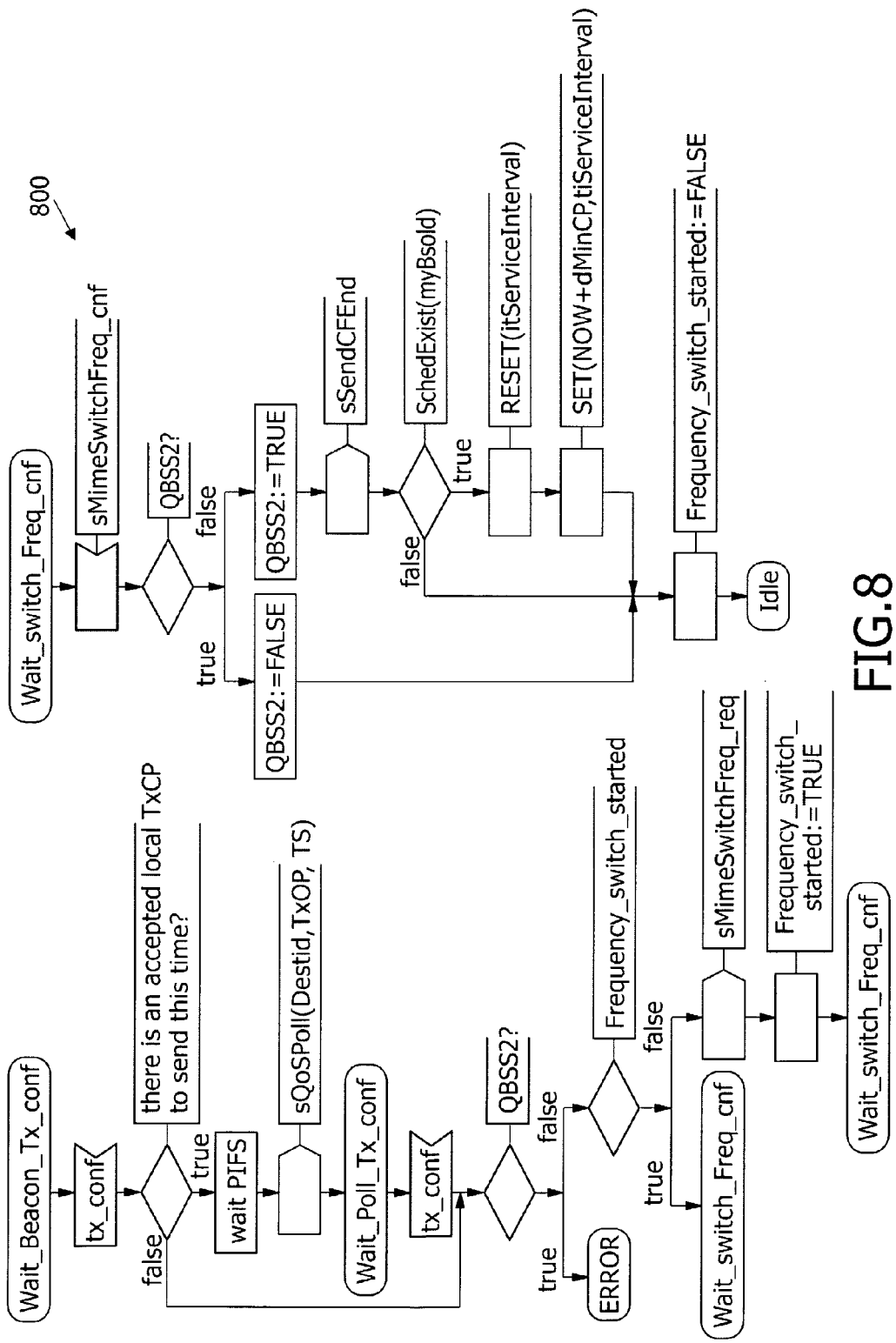

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A network array comprising:
   a first network having a plurality of first nodes;
   a second network having a plurality of second nodes, wherein both the first network and the second network are wireless networks and the first network is adapted as an infrastructure network and the second network is adapted as an ad-hoc network; and
   a forwarder node, wherein the forwarder node constitutes one of the first nodes and constitutes one of the second nodes to form a communication interface between the first network and the second network in such a manner that the forwarder node functions as a slave in the first network and as a master in the second network, wherein:
   the forwarder node is adapted to communicate with the first network using a first operation frequency and is adapted to communicate with the second network using a second operation frequency which is different from the first operation frequency, and
   wherein the forwarder node is adapted, prior to forwarding a data packet from the first network to the second network or to forwarding a data packet from the second network to the first network, to negotiate the data packet between the first and second networks and to assign a certain bandwidth for forwarding the data packet to predict time intervals indicating when the presence of the forwarder node is required in one of the first and second networks.

2. The network array of claim 1, wherein the first network is adapted as a master-slave network and the second network is adapted as a master-slave network.

3. The network array of claim 1, wherein the plurality of first nodes include a communication hub that functions as a master in the first network.

4. The network array of claim 1, wherein the plurality of first nodes include at least one node which functions as a further slave in the first network.

5. The network array of claim 1, wherein the forwarder node is adapted to function as a Hybrid Coordinator in the second network.

6. The network array of claim 1, wherein the forwarder node is adapted to switch between a first operation state in which the forwarder node is communicatively coupled with the first network and is free of a communication with the second network, and a second operation state in which the forwarder node is communicatively coupled with the second network and is free of a communication with the first network.

7. The network array of claim 6, wherein the forwarder node is adapted to block a data packet originating from the second network when the forwarder node is operated in the first operation state.

8. The network array of claim 6, wherein the forwarder node is adapted to, prior to switching from the first operation state to the second operation state, send a control signal to a master of the first network indicating that the forwarder node functioning as a slave in the first network will switch over into a sleeping mode.

9. The network array of claim 1, wherein the forwarder node is realized as a single transceiver.

10. The network array of claim 1, wherein at least a part of the plurality of first nodes and/or of the plurality of second nodes is realized as a computer device.

11. A forwarder device for forming a communication interface between a first network and a second network of a network array, wherein both the first network and the second network are wireless networks and the first network is adapted as an infrastructure network and the second network is adapted as an ad-hoc network, the forwarder device being adapted:

to constitute one of a plurality of first nodes of a first network and being adapted to constitute one of a plurality of second nodes of a second network to form a communication interface between the first network and the second network in such a manner that the forwarder device functions as a slave in the first network and as a master in the second network;

to communicate with the first network using a first operation frequency and to communicate with the second network using a second operation frequency which is different from the first operation frequency; and prior to forwarding a data packet from the first network to the second network or to forwarding a data packet from the second network to the first network, to negotiate the data packet between the first and second networks and to assign a certain bandwidth for forwarding the data packet to predict time intervals indicating when the presence of the forwarder node is required in one of the first and second networks.

12. The forwarder device of claim 11, being adapted to function as a hybrid coordinator in the second network.

13. The forwarder device of claim 11, being adapted to switch between a first operation state in which it is communicatively coupled with the first network and is free of a communication with the second network, and a second operation state in which it is communicatively coupled with the second network and is free of a communication with the first network.

14. The forwarder device of claim 13, being adapted to, prior to switching from the first operation state to the second operation state, send a control signal to a master of the first network indicating that the forwarder device functioning as a slave in the first network will switch over into a sleeping mode.

15. The forwarder device of claim 11, being adapted to block a data packet originating from the second network when the forwarder device is operated in the first operation state.

16. The forwarder device of claim 11, realized as a single transceiver.

17. A method of operating a forwarder device for forming a communication interface between a first network and a second network of a network array, wherein both the first network and the second network are wireless networks and the first network is adapted as an infrastructure network and the second network is adapted as an ad-hoc network, comprising:

adapting the forwarder device to constitute one of a plurality of first nodes of a first network and adapting the forwarder device to constitute one of a plurality of second nodes of a second network to form a communication interface between the first network and the second network in such a manner that the forwarder device functions as a slave in the first network and as a master in the second network; and adapting the forwarder device to communicate with the first network using a first operation frequency and adapting the forwarder device to communicate with the second network using a second operation frequency which is different from the first operation frequency, and adapting the forwarder device, prior to forwarding a data packet from the first network to the second network or to forwarding a data packet from the second network to the first network, to negotiate the data packet between the first and second networks and to assign a certain bandwidth for forwarding the data packet to predict time intervals indicating when the presence of the forwarder node is required in one of the first and second networks.

18. The method of claim 17, comprising:

sending, using the second operation frequency, a Beacon signal with a contention-free period set according to an absence time of the forwarder device in the second network;

switching from the second operation frequency to the first operation frequency;

negotiating, during a contention period of the first network, of traffic streams to be forwarded;

activating an automatic power-safe delivery bit during the traffic-stream negotiation process;

receiving or transmitting forwarded data in the first network;

switching from the first operation frequency to the second operation frequency;

receiving or transmitting forwarded data in the second network; and receiving or transmitting local traffic in the second network.

* * * * *